March 24, 1964    R. ESPETVEDT    3,126,035
SHEATHINGS FOR PIPES AND SIMILAR TUBULAR
MEMBERS FOR PROTECTING SAME
Filed Oct. 20, 1959

INVENTOR:
RANDOLF ESPETVEDT.
BY

United States Patent Office 3,126,035
Patented Mar. 24, 1964

3,126,035
SHEATHINGS FOR PIPES AND SIMILAR TUBULAR MEMBERS FOR PROTECTING SAME
Randolf Espetvedt, 16, Hans Tanksgate, Bergen, Norway
Filed Oct. 20, 1959, Ser. No. 847,584
Claims priority, application Norway Nov. 3, 1958
1 Claim. (Cl. 138—162)

This invention relates to sheathings for pipes and similar tubular members for protecting same. More particularly, the invention relates to the art of insulating pipes and the like by means of a sheathing or surrounding sleeves made from an insulating material, e.g. foamed plastics and the like.

Heretofore in the art, pipe members have been insulated by means of wrappings of insulating material, such as mineral wool in sheets, which are wrapped around the pipe to be insulated and covered by a final wrapping of moisture impermeable material such as asphalt coated paper, canvas tape, etc. Furthermore, it has been proposed to make tubular members from foamed plastics, which have been divided along a generatrix or along generatrices, whereupon the part cylindrical sleeve members obtained thereby have been arranged around the pipe to be insulated and secured by means of separate fastening parts, which may comprise an outer wrapping such as in the above mentioned method or strap members laid around the outer circumference.

In both cases, separate fastening means are necessary to keep the insulating material in position on the pipe.

This invention has for its object to provide a novel and advantageous sheathing for pipe members, which will be self-suspended or may need a minimum of additional fastening means for being kept safely in place.

Another object of the invention is to obtain a novel arrangement wherein such sheathings may be quickly and easily placed around a pipe member from pre-fabricated members in a single operation.

In accordance with the invention there is provided a pipe insulating covering which comprises substantially identical hollow semi-cylindrical sections of a substantially rigid cellular plastic material. The sections are oriented to cooperatively define a hollow cylindrical element having a longitudinal axis. The element is adapted for accommodating a pipe therein, with the sections in contact with the pipe. Each of the sections has two radial surfaces and an undercut tongue extending continuously in the longitudinal direction along one of the surfaces of each section. The other of the radial surfaces of each section is provided with an undercut groove adapted to receive the tongue of the other section in interengaging relationship, whereby the sections constitute the cylindrical element. The interengagement between the undercut tongues and grooves connects the sections securely together and defines a tortuous path for the escape of heat from the tube in order to minimize loss of heat therefrom. The cellular material of the semi-cylindrical sections has a coefficient of friction adapted to supplement cooperation between the tongues and grooves.

Further features, objects and advantages of the present invention will be apparent from the following description taken in conjunction with the accompanying drawing, wherein.

The insulating sheathing is preferably made from a material having a certain degree of resiliency but being sufficiently rigid to be kept in position about the pipe member to be insulated. Foamed plastic material based on polystyrene has appeared to be very suitable for the purpose.

Figure 1:
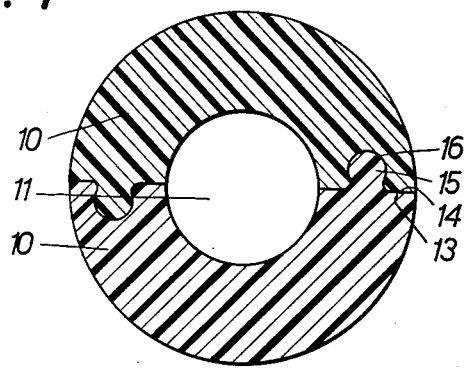
FIG. 1 is a radial sectional view of the sheathing according to an embodiment of the present invention.

In order to enable an easy mounting of the insulating sheathing, the sheathing comprises two separate sleeve part members 10 (or, possibly, a larger number of axially divided separate parts), defining together an axially extending central hollow space 11 for receiving a pipe 12 to be insulated. In order to facilitate manufacture, it is advantageous to make the sleeve part members 10 in the same mould, wherefore said parts, as shown in FIG. 1, are made as identical structures.

Said sleeve part members are locked together in an interengaging manner by means of a groove-and-tongue connection at the adjacent radially extending side faces 13 and 14, positioned at each generatrix along which the sheathing is divided. By arranging a groove 16 in one side face 13 of a first sleeve part member and a tongue 15 in the other side face 14 of the said first sleeve part member, an identical structure aforesaid of the sleeve part members is possible. In order to obtain interlocking of the tongue and the cooperating groove without requiring additional parts, the tongue as well as the groove are undercut, as shown in FIG. 1, it being preferred to shape the undercut portions with smoothly rounded parts and to dimension the groove and the tongue correspondingly whereby good connection between groove and tongue is obtained.

By employing the insulating foamed plastic material mentioned above, this material having a certain inherent elasticity or resiliency, it is possible to bring the locking means 15 and 16 of the sleeve parts into mutual engagement by snap association between the tongue and the groove. Furthermore, said interlocking connection enables easy and simple mounting as well as demounting of the insulating sheathing in a single operation without further means being necessary to keep the sheathing in place.

In order to prevent heat loss between the joint faces of the sleeve part members 10, the groove-and-tongue connection may be supplemented further by arranging adhesive material on one or both of the engaging faces thereof.

Figure 2:
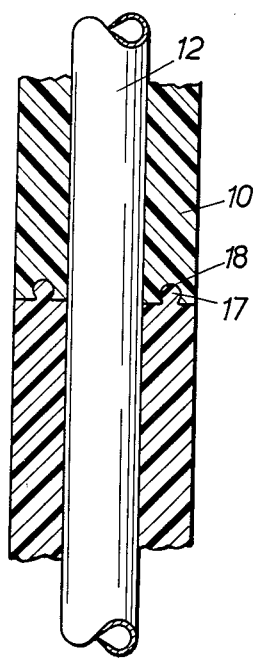
FIG. 2 is an axial sectional view of the sheathing, taken at the joint between two adjacent sleeve members according to a first embodiment.

Based on the same inventive thought, the abutting end faces of two axially abutting sleeves may be provided with a mating joint. With reference to FIG. 2, the adjoining faces at the end faces of the sleeves are provided with a groove-and-tongue connection, i.e. with an annular protrusion 17 and a corresponding groove 18, respectively. With this arrangement, a certain mutual reinforcement of the sleeve parts of two abutting sleeves can be obtained by turning one sleeve through an angle of about 90° on its axis with relation to the other sleeve. In the embodiment shown, the protrusion 17 and groove 18 are undercut in order to obtain a secure interlocking at the abutting end faces of the sleeves.

Figure 3:
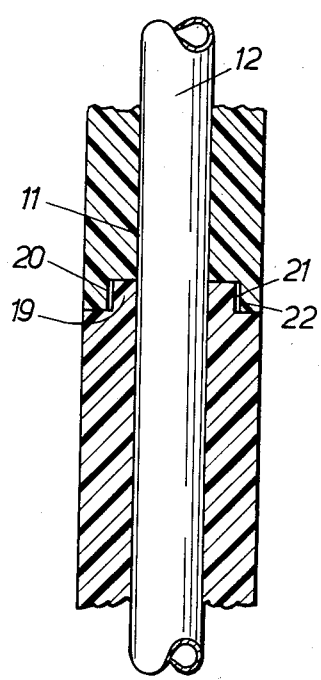
FIG. 3 illustrates in an axial sectional view similar to FIG. 2 an alternative embodiment of the sheathing.

It is possible to modify the end faces to arrange for the joining of two sleeves as shown in the embodiment of FIG. 3. In accordance with this embodiment, the protrusion 19 is arranged on the face bordering the central hollow space 11, while the groove 20 is also arranged facing towards said space. Furthermore, there is indicated in FIG. 3 an axially extending chamber defined by wall 21 of one sleeve and wall 22 of the abutting sleeve, such chamber reducing the heat transfer at the adjoining end faces.

It will be obvious to those skilled in the art that various changes may be made in this invention without departing from the spirit and scope thereof, and therefore the invention is not limited by that which is shown in the drawings and described in the specification but only as indicated in the appended claim.

What I claim is:

A pipe insulating covering comprising substantially identical hollow semi-cylindrical sections of a substantially rigid cellular plastic material, said sections being oriented to cooperatively define a hollow cylindrical element having an axis, said element being adapted for accommodating a pipe therein with said sections in contact with said pipe, each of said sections having two radial surfaces, and an undercut tongue extending continuously along one of said surfaces of each section in a direction parallel to said axis, the other of said radial surfaces being provided with an undercut groove adapted to receive the tongue of the other section in interengaging relationship whereby said sections constitute the cylindrical element and in which the interengagement between the undercut tongues and grooves connects the sections securely together and defines a tortuous path for the escape of heat to minimize loss of the latter, said cellular material having a coefficient of friction adapted to supplement cooperation between said tongues and grooves.

References Cited in the file of this patent

UNITED STATES PATENTS

| | | |
|---|---|---|
| 102,116 | Harris et al. | Apr. 19, 1870 |
| 1,105,844 | Schapervahn | Aug. 4, 1914 |
| 1,789,819 | Jones | Jan. 20, 1931 |
| 2,602,764 | Billingham | July 8, 1952 |
| 2,717,848 | Jaye | Sept. 13, 1955 |
| 2,784,129 | Stephens | Mar. 5, 1957 |